United States Patent [19]

Ljungström

[11] Patent Number: 4,471,847
[45] Date of Patent: Sep. 18, 1984

[54] ELECTRONIC SCALE

[75] Inventor: Karl R. T. Ljungström, Sollentuna, Sweden

[73] Assignee: Aktiebolaget Electrolux, Stockholm, Sweden

[21] Appl. No.: 488,550

[22] PCT Filed: Jul. 5, 1982

[86] PCT No.: PCT/SE82/00234
§ 371 Date: Mar. 7, 1983
§ 102(e) Date: Mar. 7, 1983

[87] PCT Pub. No.: WO83/00223
PCT Pub. Date: Jan. 20, 1983

[30] Foreign Application Priority Data

Jul. 10, 1981 [SE] Sweden .............................. 8104314

[51] Int. Cl.³ .................... G01G 3/14; G01G 21/08
[52] U.S. Cl. ..................................... 177/211; 177/256
[58] Field of Search ....... 177/210 R, 210 EM, 210 C, 177/210 FP, 211, 256; 73/862.65

[56] References Cited

U.S. PATENT DOCUMENTS 3,938,603  2/1976  Shoberg et al. ............. 177/225 X
4,274,501  6/1981  Gallo et al. ................. 177/210 FP
4,382,479  5/1983  Lee et al. .................... 177/210 C X

FOREIGN PATENT DOCUMENTS 1031542  4/1958  Fed. Rep. of Germany .

Primary Examiner—Harry E. Moose, Jr.
Assistant Examiner—Patrick W. Foster
Attorney, Agent, or Firm—Alfred E. Miller

[57] ABSTRACT

An electronic scale in particular intended to be used as a platform scale. The scale comprises a sensor device having six supporting points which in a plan view form the corners of two triangles. The supporting points situated at the corners of one of the triangles are connected to a base whereas the scale pan is supported at the supporting points at the corners of the second triangle. The sensor device comprises a body which is so connected to the different supporting points that it is subject to a bending moment when the scale pan is loaded. The sensor device is also provided with electrical means for indicating the bending moment.

12 Claims, 9 Drawing Figures

ELECTRONIC SCALE

This invention relates to an electronic scale.

Generally, exact measuring of a force in one direction is comparatively simple. Thus, for instance by weighing in a suspended scale, pan exact weight information can be obtained by using one measuring sensor. However, in most cases a swinging and unstable scale pan cannot be accepted but a substantially rigid pan or platform for the load is needed.

In order to achieve a stable scale pan the pan could for instance be suspended on three arms extending from a base and being connected to the pan by means of strain gauges. Alternatively, a load cell could be placed under each corner of a platform. Both these solutions require several sensors which have to be trimmed to exactly the same sensitivity in order to indicate the same weight independently of the position of the load on the pan or the platform. Such constructions are technically relatively complex and expensive.

If, instead, a central load cell below the middle of the platform is used, large moments are produced when the load is moved to a corner. These moments must be taken up by the load cell without any registration error, which is hardly possible to achieve not even with specially designed load cells, particularly when the platform is large or the demand for accuracy is great.

To eliminate such side forces and undesired moments, known mechanical scale constructions having means for parallel guiding of the platform have been used. The electronic sensor is in these cases so disposed that the force is taken up solely in one direction. In some cases, such sensors have been substituted for a weighing spring or a system of balancing weights. When the original mechanical scale construction has been of an expensive precision type and the integration of the sensor has been made with great exactness, a good result has been achieved, although at a very high cost.

It is also previously known (U.S. Pat. Nos. 4,274,501 and 4,276,949), to use scales having intermediate measuring units which are supported at six points and which are provided with sensor means. However, the supporting joints are so arranged that the levers are very short, and consequently the accuracy is also very low. Another drawback when using this type of scales is that the supporting points are formed as knives which can easily be damaged and subject to wear affecting the exactness of the scale.

The failure of many attempts to modify existing mechanical scales for electronic weighing depends on the fact that sometimes such short balancing arms have been used in the mechanical construction that the demand for accuracy with respect to the length of the arm has been of the magnitude of 1/1000 mm. This is difficult both to achieve and to maintain, i.a. due to wear.

The basis of this invention is the desire to provide an electronic scale which is simple and cheap from a manufacturing point of view and comprises a sensor which, as far as possible, eliminates all undesirable forces and moments caused by the positioning of the load on a platform or the like, and which only needs one sensor. The construction should also be such that short moment arms, which demand great manufacturing precision, and also knives and sockets which can result in friction or wear are avoided. The length of the moment arms should be optimized to be as long as mechanically possible. Further, no mechanical adjustment on assembly should normally be necessary.

The above object is achieved according to the invention by using a so-called double three-point support, meaning that the scale pan or corresponding part is supported at three points in a sensor device which in turn is supported at three other points in a base. By using two three-point supports the construction is statically fully determined.

The invention will now be described by way of example with reference to the accompanying drawings.

Figure 1:
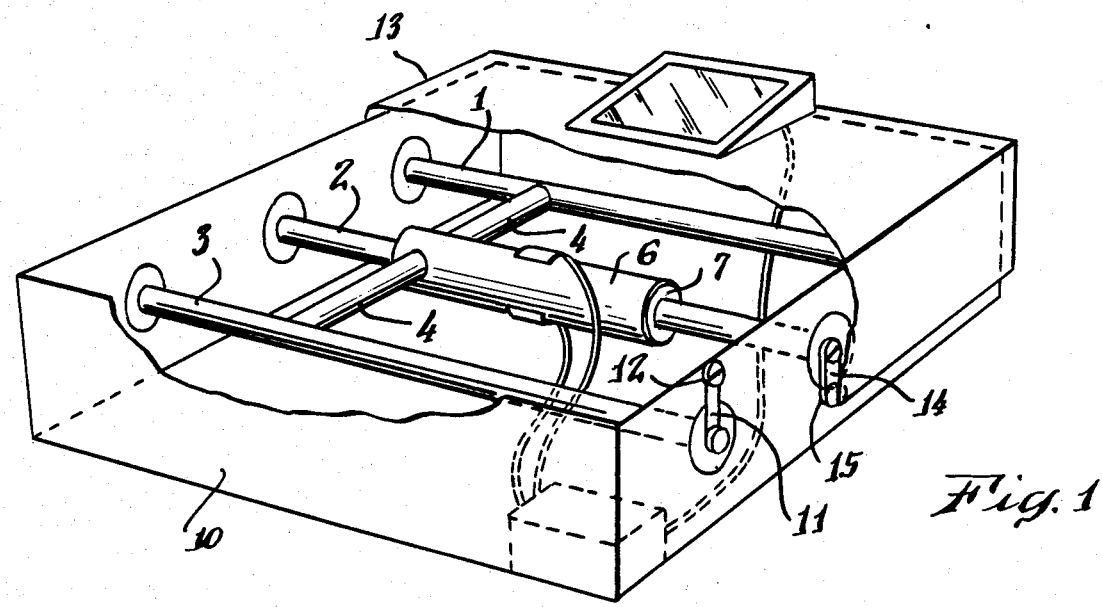
FIG. 1 is a partly broken perspective view of an embodiment of a scale according to the invention.
Figure 2:
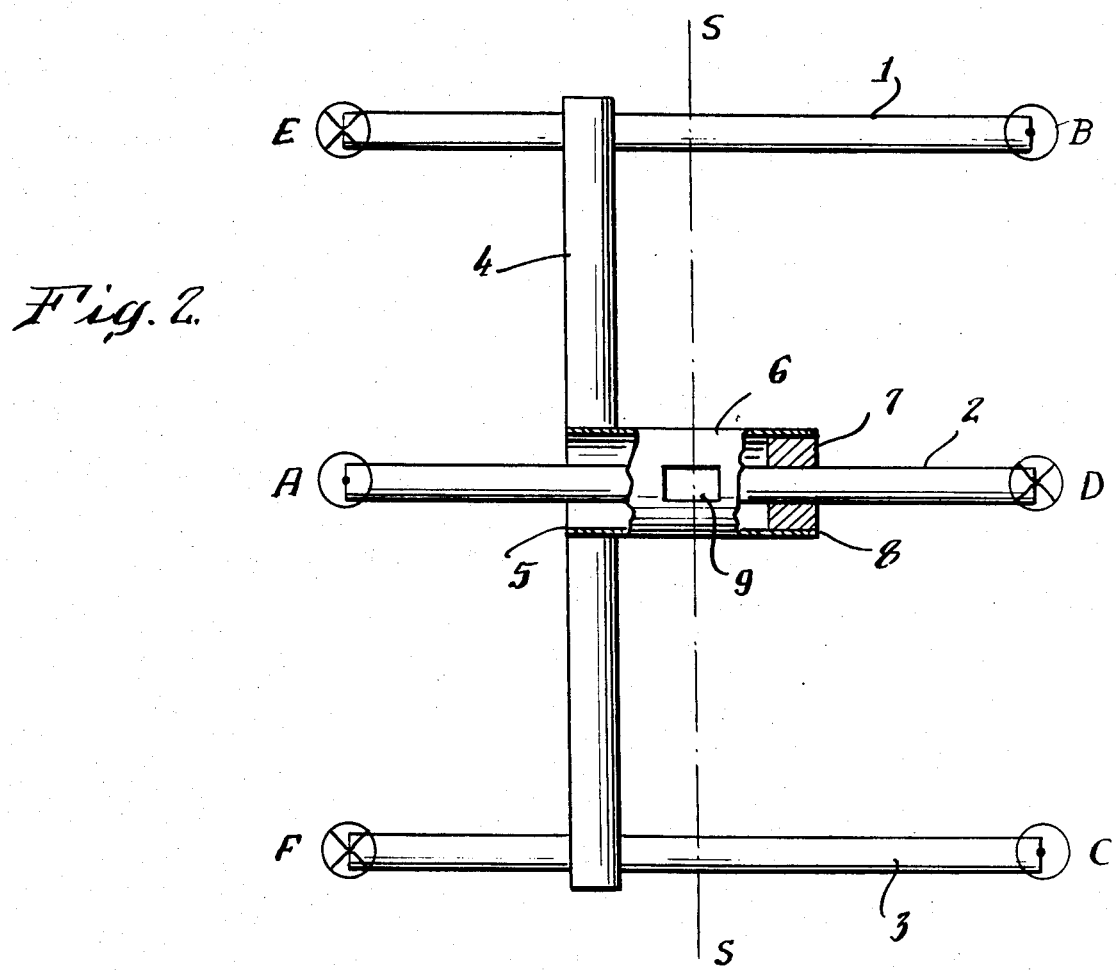
FIG. 2 is a plan view, partly in section, of an embodiment of a sensor device according to the invention.

The sensor device shown in a plan view in FIG. 2 comprises six supporting points A, B, C, D, E and F, which are connected in pairs by arms 1, 2 and 3. The arms 1 and 3 are also connected to a cross bar 4, which is rigidly connected to one end 5 of a measuring body in the form of a tube 6. The arm 2 extends freely through the tube 6 and is rigidly connected to the opposite end 8 of the tube by means of a sleeve 7. Thus, the complete sensor device forms an integral unit without any linked connection.

Since all supporting points are rigidly connected to one or the other of the ends of the tube 6 by means of arms the latter will, when loading the sensor device, be subject to a bending moment, which in a conventional way is sensed by means of electric strain gauges 9 provided on the upper and lower sides of the tube. The strain gauges 9 are electrically connected to a box, which is provied with an electric source, such as a battery, and means for processing and transforming the signal to a display.

The supporting points A, B and C of the sensor device of FIG. 2, which are indicated as tips of arrows, are fastened to a base, which can be box-shaped, whereas the scale pan or corresponding part is fastened to the supporting parts D, E and F which are indicated ends of arrows.

The supporting points defining in the two three-point supports form corners, each in an isosceles triangle ABC and DEF, respectively. The points A and D form the apexes of the triangles and it is important that the strain gauges 9 are placed exactly at the half height points of each triangle. According to FIG. 2 the arm 2 is coaxial with an imaginary height line in the relevant triangle.

Due to the use of the double three-point support the sensor device is acted upon by six main forces when the scale pan is loaded centrally, all of the forces being directed vertically, i.e. perpendicular to the plane of the paper. The effect of the three-point supports is that the force system is statically fully determined and self-adjusting. Thus, if the base is uneven or inclined this causes only an error which depends on the shortening of the projected length of the moment arm concerned. This error is in most cases negligible so that normally no levelling of the scale will be necessary.

Figure 3:
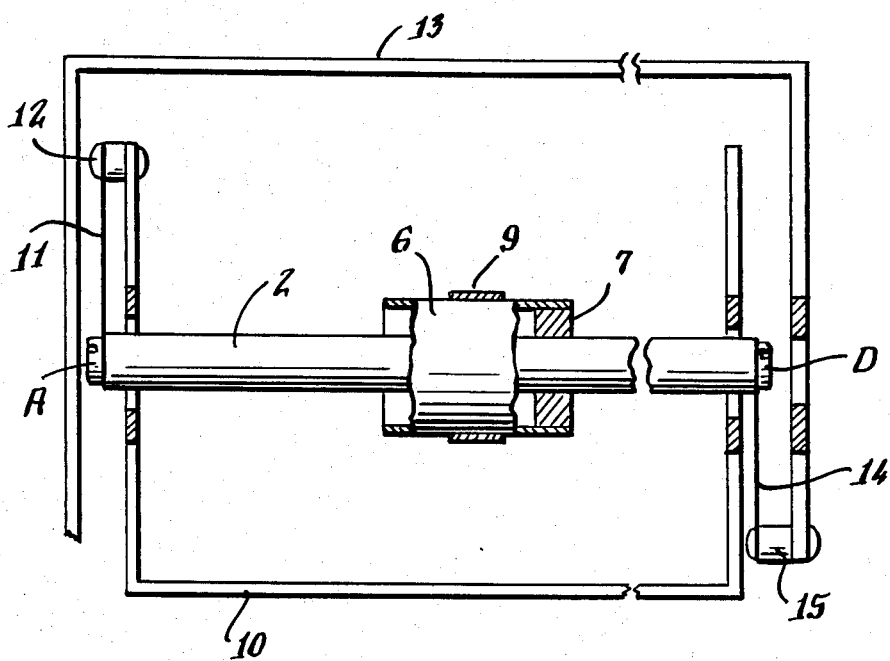
FIG. 3 is a vertical section through a scale according to the invention.

The sensor device according to FIG. 2 can for instance be suspended in the manner shown in FIG. 3. The arm connecting the supporting points A and D to one end 8 of the measuring tube 6 is, as in FIG. 2, denoted by 2. The point A is thus supported in a box 10 serving as a base by means of a leaf spring 11, which is riveted to the wall of the box at 12. In a similar way also the points B and C are supported at the opposite wall of the box.

A scale pan 13 is supported by means of a leaf spring 14 at the supporting point D. The spring 14 is at 15 after pan riveted to the pan. In a similar way the pan at its opposite edge is supported at the supporting points E and F.

To avoid turning moments about the length axis of the sensor tube 6 the springs 11 and 14, respectively, should be rotatably supported at the ends of the arm 2. Other fastening points are rigid. By using leaf springs some axial displacement between the pan and the base is allowed at the same time as the springs operate to centre these parts in relation to each other. In addition to tensile forces the springs should also be able to transmit some compressive forces as will appear below. The leaf springs can however be replaced by other equivalent types of hanger.

In the scale according to FIG. 3, which is provided with a sensor device according to FIG. 2, if the tare weight of the sensor device is not taken into account, the sum of the three downwardly directed forces acting on the sensor device and originating from the scale pan with load will equal the sum of the upwardly directed reaction forces originating from the base. Moving the load between different points of the scale will of course not influence the size of the sum of the forces, which means that the sensor tube 6 will be subject to the same bending moment about its central plane S—S in FIG. 2, where the strain gauges 9 are placed, independently of the position of the load on the scale pan. No turning moment about the length axis is transmitted because of the above noted fastening of the hanger 11 and 14.

If as an example the forces are considered when the weight P is centrally placed on the scale pan and if the tare weights of the pan and the sensor device are not taken into account, the forces at the points A and D will both be P/2 but directed in opposite directions. The forces at the points B, C and E, F, respectively, will each be P/4 and two and two be directed opposite to one another. It can easily be shown that the moment which is transmitted to the right-hand end of the sensor tube by means of the couple of forces A-D is equal to but directed opposite to the moment which is transmitted to the left-hand end from the couples of forces B-E and C-F. If the distance between the points A and D is denoted by L, the size of the moment M, which is measured at the central plane S—S by the strain gauges 9 will be:

$$M = P \times L/2.$$

If now the load is moved from the centre so that it will be situated for instance exactly above the point A, the force at A will increase to the value of P whereas the forces at B and C will be 0. The forces at points E and F will each increase to P/2 and the force at D will be 0. The vertical forces acting on the sensor device of course balance each other and the moment M at the central plane of the sensor will also in this case be:

$$M = P \times L/2.$$

If now the load P is assumed to be moved to a corner of the scale pan, for instance exactly above the point E in FIG. 2, the system will tend to turn about an imaginary connecting line between the points A and B and thus be lifted at the point C. However, since the supporting springs can also take up compressive forces the system will be kept at the point C by an opposite force. There will be no force at the points D and F.

It is easy to show that the force at the point C amounts to P/2 and that the force at the point A amounts to P and at the point B to P/2. These forces are directed opposite to the force at the point C. This force constellation creates a turning moment of the cross bar 4, which however does not influence the sensor 9, which means that the moment at the central plane S—S still will be:

$$M = P \times L/2.$$

In a similar way it is possible to show that if the weight is moved to any other point on the scale pan generally no false moments or forces will be transmitted to the sensor tube 6 although in certain cases moments are produced in the rigid cross connection. If the tare weights of the scale pan and sensor device are taken into account this will only give a fixed addition to the tare, which can easily be balanced electrically.

Figure 4:
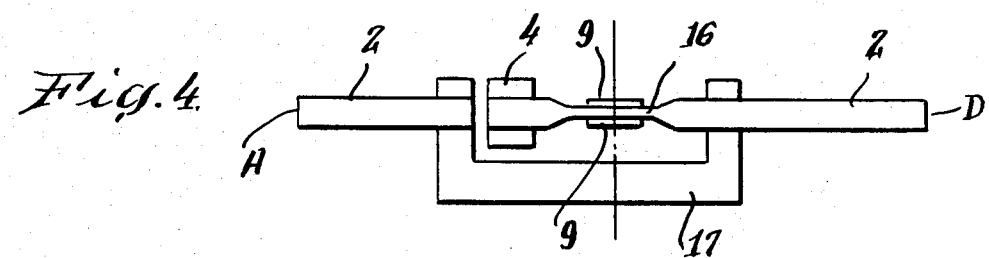
FIG. 4 shows in a side view an alternative embodiment of a central part of the sensor device of FIG. 1.

The sensor device in FIG. 4 is not tubular but homogenous and has a waist part 16 to which the strain gauges are applied. The moment is thus transmitted from the point A via the central arm 2 and a yoke 17 to the right-hand end of the sensor device, which as in FIG. 2 is in connection with the point D. The moment from the other supporting points is transmitted as above to the left-hand end of the sensor device by means of the cross bar 4.

This embodiment is in particular suited for very sensitive scales and when it is desired to use a sensor material which cannot easily be manufactured as a tube. The sensor device can however be modified also in other ways, and may for instance only be an extension of the central arm 2. Also in this case a yoke 17 is used according to FIG. 4.

Figure 5:
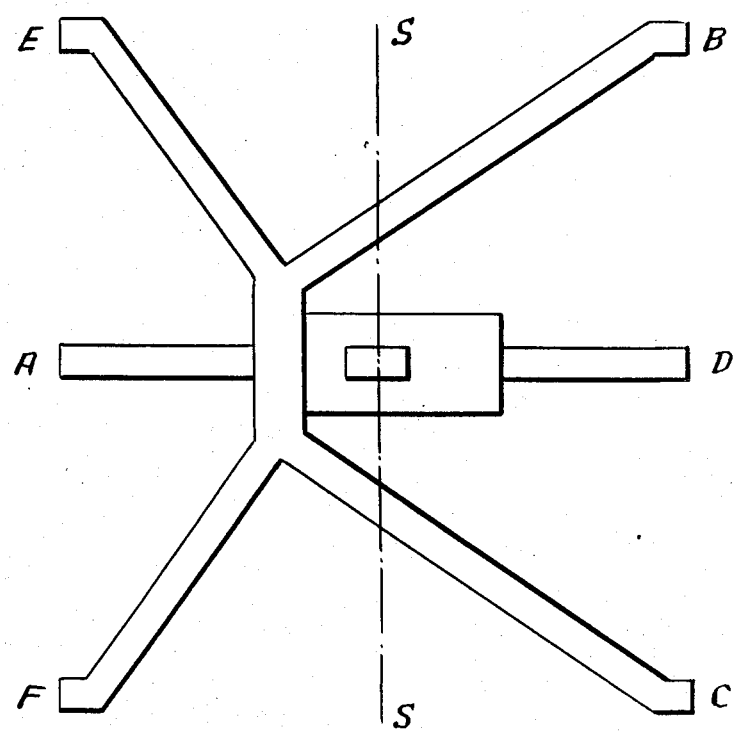
FIG. 5 is a plan view of an alternative embodiment of a sensor device according to the invention.

In a sensor device according to FIG. 5 the outer arms and the central bar connecting these arms are generally of X-shape. Thus, it is possible to save material and to reduce the weight by using cast silumin or the like. The function is however the same as that of the sensor device of FIG. 2.

Figure 6:
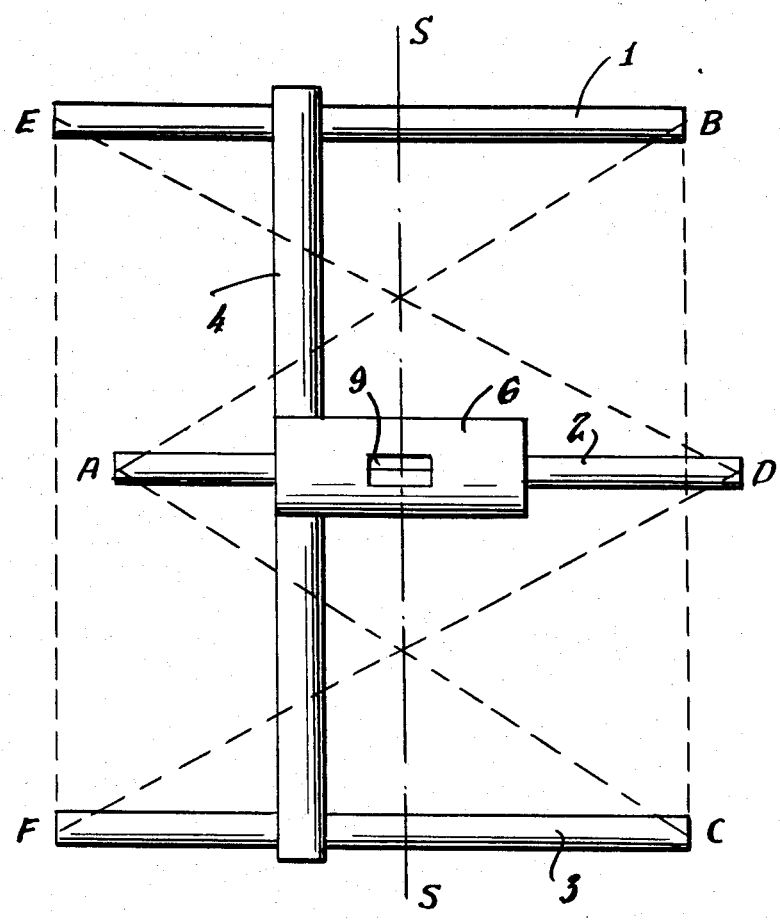
FIG. 6 is a plan view of another embodiment of a sensor device.

In the modification in FIG. 6 the central arm 2 is displaced with respect to the side arms. As appears from the isosceles triangle indicated in the Figure the strain gauges are still placed on a common central plane S—S dividing the height in each triangle into two equal parts. This embodiment can in some cases be advantageous in order to facilitate and give more space for the hangers.

Figure 7:
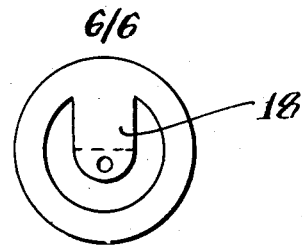
FIG. 7 shows an embodiment of a hanger.
Figure 8:
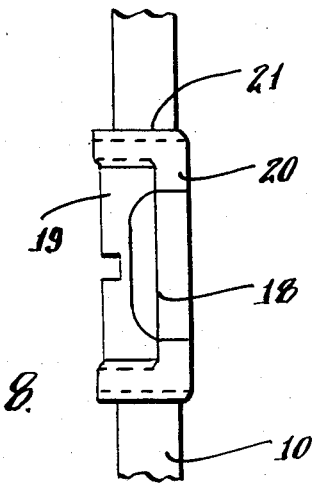
FIG. 8 is a fastening means for the hanger of FIG. 6.

In the embodiment in FIG. 7 the hanger can be manufactured by photoengraving or punching of a suitable spring metal. The hanger can for instance be fastened to the box 10, as illustrated in FIG. 8, by means of a clamp screw 19 which co-operates with an adjusting screw 20, the length of is adjustable by means of a thread 21. This could be desirable for fine-adjustment of scales of a very high precision.

Figure 9:
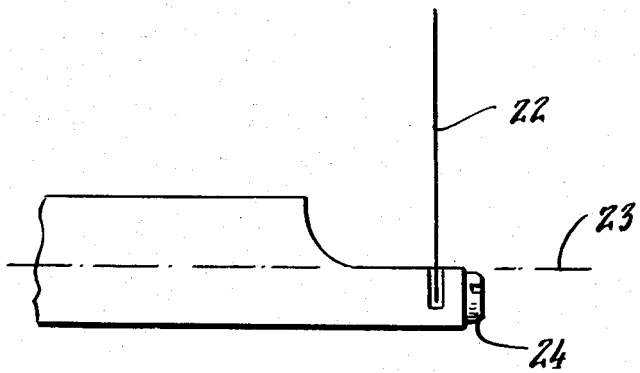
FIG. 9 illustrates fastening of a hanger in one of the arms of the sensor device.

In scales of very high precision it can also be advantageous that the hangers, as shown with respect to a hanger 22 in FIG. 9, are fastened to the arms of the sensor device in such a way that there will be no contact between the hanger 22 and the arm in a position corresponding to the central plane 23 of the sensor device. The hanger 22 can for instance be inserted in a slot and be fixed by means of a screw 24. The hanger 22 can also be so arranged that it will have no contact with the arm in the position which corresponds to the central plane of the sensor device when deflected by normal load. This can be of particular importance when using highly pre-loaded scales demanding great accuracy.

In order to adjust the length of the arm, i.e. the supporting point of the hanger, in precision scales of the type described above with respect to the centre of the sensor device, it is also possible to arrange a cup-spring washer or the like between the end of the arm and the hanger. This washer can be compressed as much as necessary by means of the mounting screw of the hanger and be locked, for instance by glue, in the desired position. By such an adjustment it is possible to compensate for minor errors when mounting the strain gauges.

The embodiments of a device according to the invention described above should only be regarded as preferred embodiments and a number of further modifications are possible within the scope of the principle of the double three-point support as defined in the claims, in particular with respect to the geometrical shape of the supporting arrangement and its suspenders. Thus, the position of the supporting triangles with respect to one another could vary and the orientation of the strain gauges be adjusted so that they sense the bending moment.

By using this invention it is comparatively simple to manufacture scales which can be converted over to different sensing ranges. This can be done by placing a first sensor device, intended to be used for comparatively small loads, on a second sensor device, intended to be used for greater loads and which is tared for the weight of the first device. The scale pan of the second device and the base of the first device are suitably built together as one unit.

Since all loads are intended to be placed on the scale pan of the first sensor device it must be possible to overload this device. For this reason, stop means which operate when the maximum load of the first sensor device has been reached are provided, for instance on the pan.

By means of a switch-over device the signals from the first or the second sensor device can be freely chosen to be connected to the measuring electronics so that the same scale apparatus can be used for weighing small loads with high resolution as well as heavy loads. Switching-over between different sensing ranges can be effected automatically, for instance in dependence of the magnitude of the measured signal.

In the way described above an optional number of sensor devices can be placed on each other in order to give the necessary resolution in a desired measuring range.

Although all the examples above relate to platform scales, the principle of the solutions can also be applied for instance to load cells, in which the problems are mainly the same, or to other force sensing devices.

It should be observed that it is not necessary to use isosceles triangles although such an arrangement is preferred. Thus, it is possible to use triangles having different side lengths as long as the sensor is placed at or near the middle part of the height of the triangles.

I claim:

1. In an electronic scale including a sensor device, support means having six support points which in a plan view form the corners of two triangles, the support points situated at the corners of one triangle being connected to a base, a weighing receptacle means being supported by the support points at the corners of the other triangle, the apexes of the triangles being oppositely directed, the bases of the triangles being parallel with the triangles partly overlapping each other in a plan view; the improvement wherein a half height point in each triangle is common to both triangles, said sensor device being mounted at said point and comprising a body having sensors, the body being rigidly connected to said six support points via a system of arms so that the action center of the sensor body is located at said common point.

2. The scale according to claim 1, wherein the apex of each triangle as seen in a plan view is located substantially on the base of the other triangle.

3. The scale according to claim 1 or claim 2, wherein said body is connected to said support points by means of three arms, one of the arms being connected to the support points which form the apexes of the triangles and being rigidly connected to one end of the body and the other of said three arms being rigidly connected to the opposite end of the body.

4. The scale according to claim 1, wherein said body is cylindrical and arranged coaxially with respect to the arm extending between the apexes of the triangles, said last mentioned arm being rigidly connected to the other end of the cylindrical body.

5. The scale of claim 4 wherein said other arms are rigidly connected to the other end of the cylindrical body by intermediate spacing means.

6. The scale according to claim 1, wherein the corners of the two triangles are interconnected by three parallel rods forming said arms, the middle rod extending along the height lines of the triangles and being connected to one end of said body, the two other rods being connected to the opposite end of said body by means of a cross bar.

7. The scale according to claim 1, wherein the sensor device and the receptacle means are so supported at said points that a certain degree of movement is allowed in the direction of the length of the arms.

8. The scale of claim 7 wherein said support points comprise leaf springs.

9. The scale according to claim 1 wherein at least two sensor devices having different characteristics are stacked one above the other in order to create different sensing ranges for the scale.

10. The scale according to claim 9, comprising a stop means which is activated when the maximum load of the relevant sensor device is reached, further increasing weight being registered by a less sensitive sensor device.

11. The electronic scale of claim 1 wherein said weighing receptacle means comprises a scale pan.

12. An electronic scale comprising a support means having six support points, said six points defining first and second overlapping triangles with parallel bases and oppositely directed apexes, the half height points of each triangle being common to the other triangle, means supporting said support means at the point defining one of said triangles and weighing receptacle means supported from said support means at the remaining support points, a support body mounted on said support means in the region of said point, whereby weight on said weighing receptacle means induces strain in said support body, and strain measuring means on said support body at said point.

* * * * *